(12) United States Patent
Park (10) Patent No.: US 10,431,141 B2
(45) Date of Patent: Oct. 1, 2019

(54) DISPLAY DEVICE

(71) Applicant: Samsung Display Co., Ltd., Yongin-si, Gyeonggi-do (KR)

(72) Inventor: Moon-chul Park, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 26 days.

(21) Appl. No.: 15/195,616

(22) Filed: Jun. 28, 2016

(65) Prior Publication Data

US 2017/0010638 A1 Jan. 12, 2017

(30) Foreign Application Priority Data

Jul. 8, 2015 (KR) .......................... 10-2015-0097316

(51) Int. Cl.
*G09G 3/20* (2006.01)
*G06F 1/16* (2006.01)
*G06F 3/041* (2006.01)

(52) U.S. Cl.
CPC ......... *G09G 3/2092* (2013.01); *G06F 1/1637* (2013.01); *G06F 1/1643* (2013.01); *G06F 3/0416* (2013.01); *G09G 2300/04* (2013.01); *G09G 2330/04* (2013.01)

(58) Field of Classification Search
None
See application file for complete search history.

(56) References Cited

U.S. PATENT DOCUMENTS

| | | | | |
|---|---|---|---|---|
| 5,432,626 A | * | 7/1995 | Sasuga | G02F 1/133308 349/58 |
| 8,802,248 B2 | * | 8/2014 | Park | H01M 2/1055 429/121 |
| 9,774,766 B2 | * | 9/2017 | Park | H04M 1/0264 |
| 2005/0068261 A1 | * | 3/2005 | Oh | H05K 9/0039 345/60 |
| 2005/0078232 A1 | * | 4/2005 | Lo | G02F 1/136204 349/40 |
| 2007/0171215 A1 | * | 7/2007 | Song | G02B 6/0083 345/204 |
| 2008/0030961 A1 | * | 2/2008 | Koo | H05K 1/0216 361/720 |

(Continued)

FOREIGN PATENT DOCUMENTS

JP 2008-070689 A 3/2008
JP 2011-209334 A 10/2011
(Continued)

*Primary Examiner* — Chanh D Nguyen
*Assistant Examiner* — Karin Kiyabu
(74) *Attorney, Agent, or Firm* — Lewis Roca Rothgerber Christie LLP (57) ABSTRACT

A display device includes a display module including a display panel, a circuit board electrically connected to the display panel, and a driving device mounted on the circuit board and configured to apply an electrical signal to the display panel, and a case including a metal body portion, and a metal protrusion portion protruding from the metal body portion and coupled to the display module, wherein the circuit board includes a ground layer, an insulating layer, and a ground pattern electrically connected to the ground layer and facing the metal protrusion portion.

13 Claims, 8 Drawing Sheets

(56) References Cited

U.S. PATENT DOCUMENTS

| | | | | |
|---|---|---|---|---|
| 2009/0163249 A1* | 6/2009 | Seo | ............... | H04M 1/0277 |
| | | | | 455/566 |
| 2009/0284484 A1* | 11/2009 | Hwang | ............ | G06F 3/0416 |
| | | | | 345/173 |
| 2011/0188226 A1* | 8/2011 | Kim | .................... | H05K 9/00 |
| | | | | 361/818 |
| 2012/0327328 A1* | 12/2012 | Kim | ............ | G02F 1/133308 |
| | | | | 349/59 |
| 2013/0334509 A1* | 12/2013 | Hwang | .......... | H01L 27/3223 |
| | | | | 257/40 |
| 2013/0341072 A1* | 12/2013 | Lin | .................... | H05K 1/148 |
| | | | | 174/254 |
| 2014/0085546 A1* | 3/2014 | Ozeki | .......... | G02F 1/133604 |
| | | | | 348/794 |
| 2014/0133174 A1* | 5/2014 | Franklin | .......... | G02B 6/0088 |
| | | | | 362/606 |
| 2014/0252403 A1 | 9/2014 | Feichtinger et al. | | |
| 2014/0262503 A1 | 9/2014 | Rodgers et al. | | |

FOREIGN PATENT DOCUMENTS

| | | | |
|---|---|---|---|
| JP | 2014-123640 A | 7/2014 | |
| KR | 20100006340 A * | 1/2010 | ............ G09G 3/20 |
| KR | 10-2012-0063652 A | 6/2012 | |
| KR | 10-2012-0075114 A | 7/2012 | |

\* cited by examiner

DISPLAY DEVICE

CROSS-REFERENCE TO RELATED APPLICATION

This U.S. non-provisional patent application claims priority to, and the benefit of, Korean Patent Application No. 10-2015-0097316, filed on Jul. 8, 2015, the contents of which are hereby incorporated by reference in its entirety.

BACKGROUND

1. Field

The present disclosure relates to a display device. More particularly, the present disclosure relates to a display device having a metal case.

2. Description of the Related Art

A display device includes a display module and a case on which the display module is mounted. The display module includes a display panel for displaying an image, a touch panel for sensing an external touch input, and a circuit board used to drive the display panel.

Meanwhile, as a design for the case becomes important, cases in various materials have been developed. For instance, in recent years, a case formed of a metal material has been developed. However, because the case comprising a metal material has electrical conductivity, static electricity from the outside may be applied to driving devices within the display module through the case. As a result, the driving devices may be damaged due to external static electricity.

SUMMARY

The present disclosure provides a display device capable of preventing static electricity from being applied through a metal case to driving devices in a display module.

Embodiments of the inventive concept provide a display device including a display module including a display panel, a circuit board electrically connected to the display panel, and a driving device mounted on the circuit board and configured to apply an electrical signal to the display panel, and a case including a metal body portion, and a metal protrusion portion protruding from the metal body portion and coupled to the display module, wherein the circuit board includes a ground layer, an insulating layer, and a ground pattern electrically connected to the ground layer and facing the metal protrusion portion.

The metal body portion may include a bottom portion having the metal protrusion portion thereon, and a sidewall portion extending from the bottom portion toward the display module.

The metal protrusion portion may be spaced from the ground pattern.

The display device may further include a plurality of ground patterns including the ground pattern, and a plurality of metal protrusion portions including the metal protrusion portion, wherein the metal protrusion portions correspond to the ground patterns, respectively.

The display device may further include a sub-circuit board for electrically connecting the circuit board and the display panel.

The sub-circuit board may include a flexible circuit board.

The insulating layer may include a first insulating layer supporting the ground layer, and a second insulating layer covering the ground layer, wherein the ground pattern is on the second insulating layer.

The circuit board may include a via electrode for electrically connecting the ground layer and the ground pattern, and located in a contact hole defined by the first and second insulating layers.

The ground pattern may include an alignment mark, and a connector for electrically connecting the alignment mark and the via electrode.

The metal body portion may include a bottom portion, and a sidewall portion extending from the bottom portion toward the display module, and having the metal protrusion portion thereon.

The metal protrusion portion may be spaced from the ground pattern.

The display panel may further include a first pad part electrically connected to the circuit board, and the circuit board may further include a second pad part connected to the first pad part by a conductive adhesive member.

The circuit board may include a flexible circuit board.

The display device may further include a touch panel on the display panel.

The display device may further include a touch circuit board that is configured to apply an electrical signal to the touch panel, the case may include a second metal protrusion portion protruding from the metal body portion, and the touch circuit board may include a second ground layer, a second insulating layer, and a second ground pattern electrically connected to the second ground layer and facing the second metal protrusion portion.

The display device may further include a first sub-circuit board for electrically connecting the circuit board and the display panel, and a second sub-circuit board for electrically connecting the touch circuit board and the touch panel.

Each of the first and second sub-circuit boards may include a flexible circuit board.

According to the above, the circuit board includes an alignment mark to align the driving device. The alignment mark is connected to the ground, and the case includes the metal protrusion portion that faces the alignment mark.

Therefore, the static electricity applied to the inside of the case from the outside of the case is transferred to the alignment mark through the metal protrusion portion. As a result, the static electricity transferred to the alignment mark is transferred to the ground, and thus the driving device may be prevented from being damaged.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
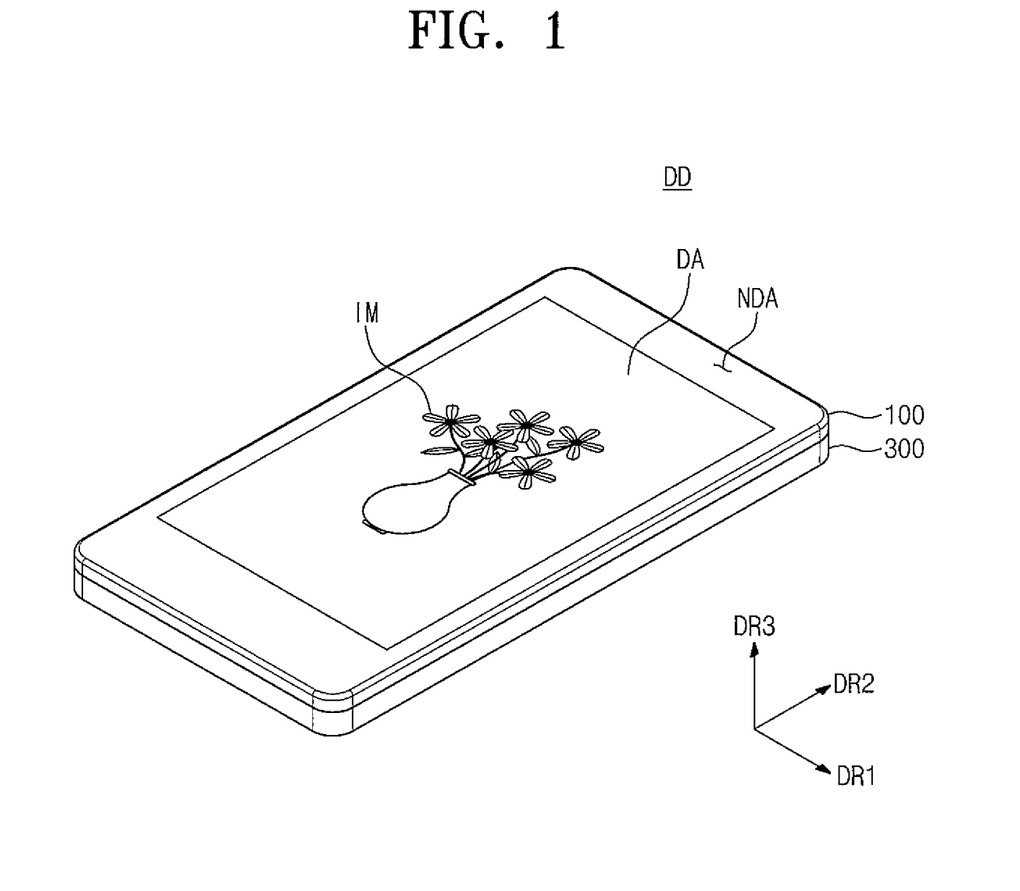
FIG. 1 is a perspective view showing a display device according to an exemplary embodiment of the present disclosure.
Figure 2:
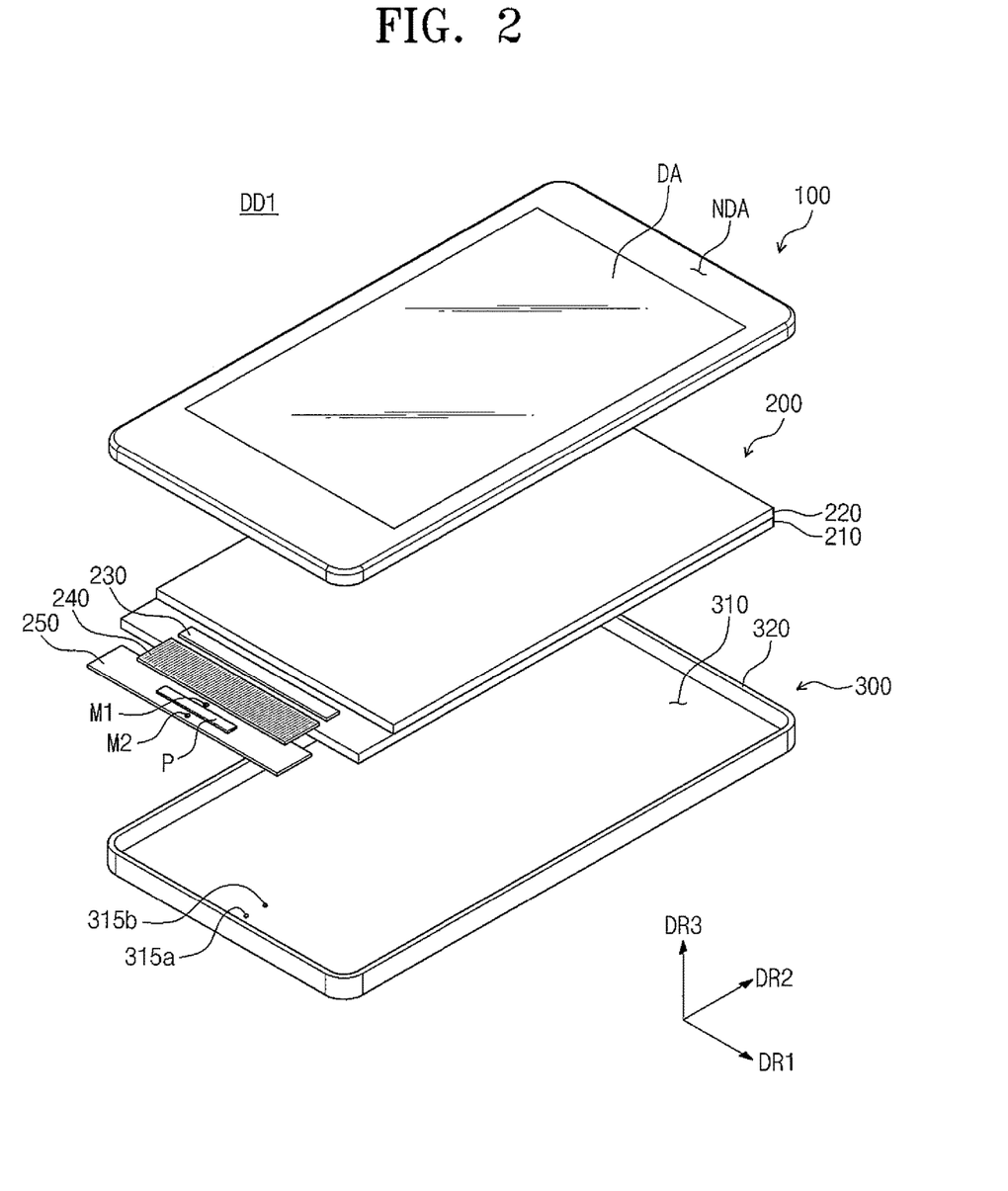
FIG. 2 is an exploded perspective view showing a display device according to an exemplary embodiment of the present disclosure.
Figure 3:
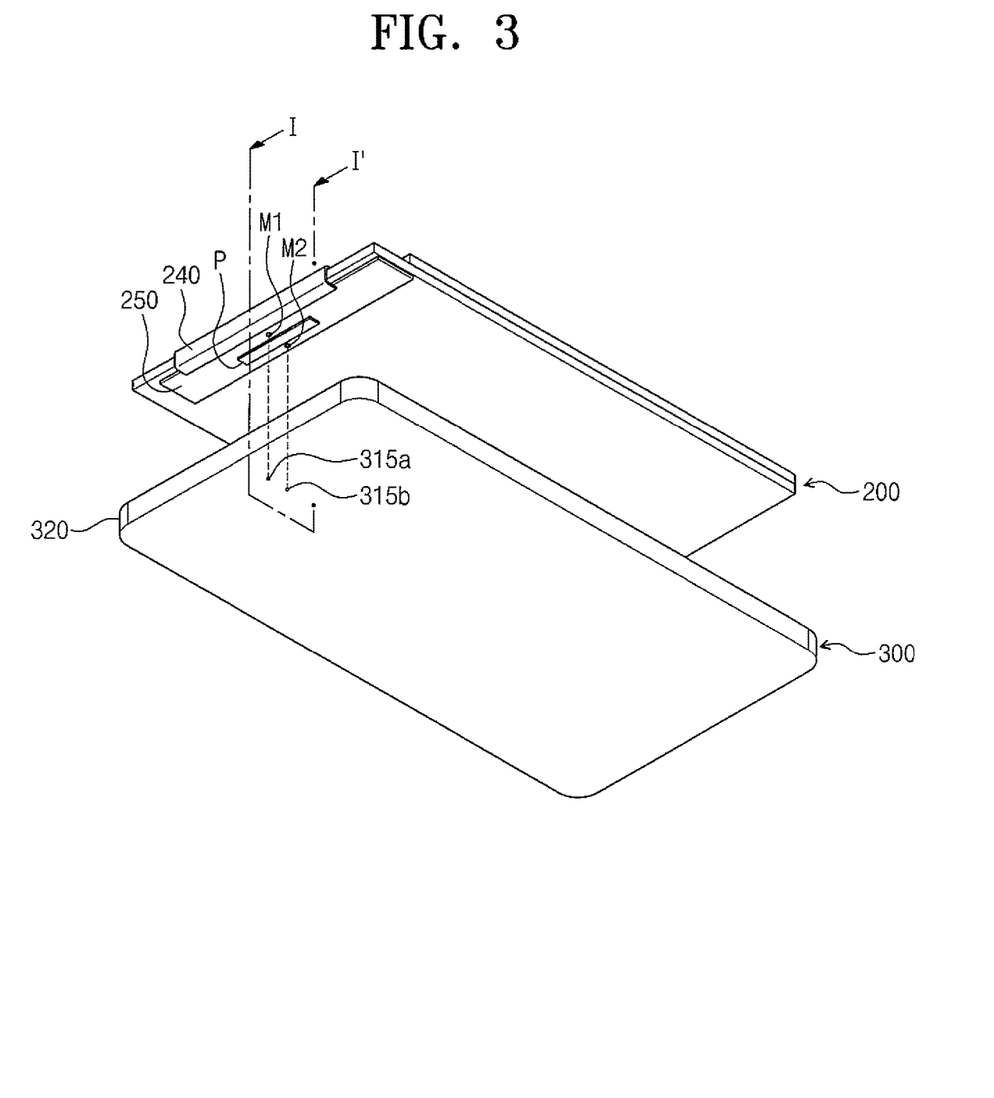
FIG. 3 is an exploded perspective view showing a display module shown in FIG. 2.

FIG. 1 is a perspective view showing a display device DD according to an exemplary embodiment of the present disclosure, FIG. 2 is an exploded perspective view showing a display device DD1 according to an exemplary embodiment of the present disclosure, and FIG. 3 is an exploded perspective view showing a display module 200 shown in FIG. 2.

FIG. 1 shows a mobile terminal to which the display device according to the present exemplary embodiment is applied. The mobile terminal may be a tablet personal computer, a smart phone, a personal digital assistant, a portable multimedia player, a game unit, a wrist-type electronic device, etc., although the present invention is not limited thereto or thereby.

The display device may be applied to a large-sized electronic item, such as a television set, an outdoor billboard, etc., and may be applied to a small or medium-sized electronic item, such as a personal computer, a notebook computer, a car navigation unit, a camera, etc., although the present invention is not limited thereto or thereby.

Referring to FIG. 1, the display device DD includes a plurality of areas when viewed in a plan view. The display device DD includes a display area DA displaying an image IM, and includes a non-display area NDA adjacent the display area DA. For instance, the display area DA has a substantially rectangular shape. The non-display area NDA surrounds the display area DA. The display device DD may be partially curved, and thus a portion of the display area DA may have a curved shape.

Referring to FIG. 2, a display device DD1 includes a window member 100, a display module 200, and a case 300.

The window member 100 is on the display module 200, and includes a display area DA through which the image IM provided from the display module 200 is transmitted, and also includes a non-display area NDA adjacent the display area DA. For instance, the window member 100 may include a cover window formed of a glass, sapphire, or plastic.

The display module 200 includes a display layer 210, a sealing layer 220, a driving integrated circuit 230, a first circuit board 240, and a second circuit board 250.

Figure 5:
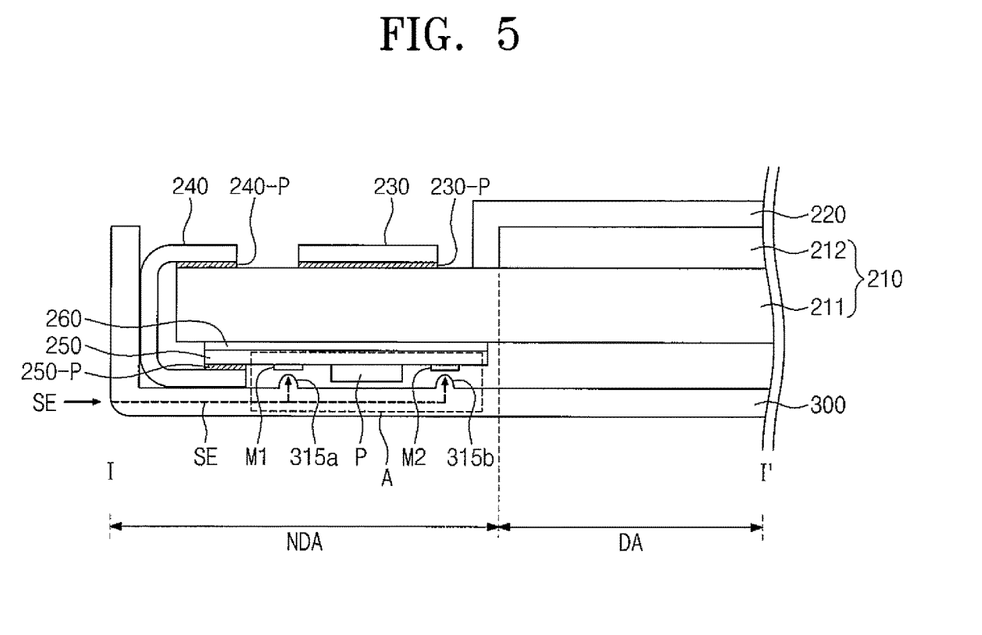
FIG. 5 is a cross-sectional view taken along the line I-I' shown in FIG. 3.

The display layer 210 includes an array substrate 211 (refer to FIG. 5) and a display part 212 (refer to FIG. 5). The array substrate 211 includes a plurality of pixels corresponding to the display area DA, and includes a plurality of signal lines respectively connected to the pixels. For instance, the signal lines may include a plurality of gate lines extending in a second direction DR2 and arranged in a first direction DR1. As an example, the signal lines may include a plurality of data lines extending in the first direction DR1 and arranged in the second direction DR2. The gate lines are insulated from the data lines while crossing the data lines.

The pixels are arranged in a matrix form defined by the first and second directions DR1 and DR2. Each of the pixels is connected to a corresponding gate line among the gate lines, and connected to a corresponding data line among the data lines. Each of the pixels is configured to generate a respective portion of the image IM in response to electrical signals provided from the corresponding gate line and from the corresponding data line.

The display part 212 is on the array substrate 211, and includes a display element.

According to the present exemplary embodiment, the display module 200 may include various display elements, e.g., a liquid crystal capacitor, an organic light emitting element, an electrophoretic element, an electrowetting element, etc. In the present exemplary embodiment, organic light emitting diodes will be described as the display elements. That is, an organic light emitting display device including an organic light emitting display panel will be described as the display device DD1.

The sealing layer 220 is on the display part 212, and seals the display part 212 to protect the display element from moisture and oxygen. The sealing layer 220 includes a transparent insulating material, and includes at least one of an organic material and an inorganic material. The sealing layer 220 may be provided in various shapes.

The driving integrated circuit 230 is connected to at least a portion of the signal lines on the array substrate 211, and is configured to apply the electrical signals to the pixels through the signal lines, respectively. According to the present exemplary embodiment, the driving integrated circuit 230 may be mounted on the display module 200 in a chip-on-glass (COG) manner.

The first circuit board 240 electrically connects the display layer 210 and the second circuit board 250. One end of the first circuit board 240 is bonded on pads that are located in an area of the display layer 210 and that are electrically connected to the display layer 210. Here, the pads in the area of the display layer 210 may be electrically connected to the driving integrated circuit 230.

In addition, the other end of the first circuit board 240 is bonded onto pads that are located in an area of the second circuit board 250 and that are electrically connected to the second circuit board 250. For instance, the first circuit board 240 may be a flexible circuit board.

A driving device P is located on the second circuit board 250 to output image signals and driving signals, which are required to display the image IM. The driving device P is electrically connected to conductive patterns arranged in a predetermined area of the second circuit board 250. The conductive patterns may be electrically connected to the first circuit board 240. As a result, the image signals and the driving signals output from the driving device P may be applied to the driving integrated circuit 230 through the first circuit board 240.

Meanwhile, although FIG. 2 shows one driving device P on the second circuit board 250, the number of the driving device P is not limited to one. That is, the second circuit board 250 may include a plurality driving devices in other embodiments.

In addition, the second circuit board 250 according to the present exemplary embodiment may include at least one alignment mark to place the driving device P. Hereinafter, in the present exemplary embodiment, the second circuit board 250 includes first and second alignment marks M1 and M2 used to align and place the driving device P.

The driving device P may be located on the second circuit board 250 by aligning the first alignment mark M1 and the second alignment mark M2. The first and second alignment marks M1 and M2 shown in FIG. 2 may have various shapes.

The case 300 may be coupled to the window member 100 and to the display module 200. According to the present exemplary embodiment, the case 300 may include a metal material having electrical conductivity. That is, the case 300 is formed of metal, and is coupled to the window member 100 and to the display module 200.

The case 300 includes a metal body portion, and includes a metal protrusion portion protruding from the metal body portion. The metal body portion includes a bottom portion 310, and includes a sidewall portion 320 bent from the bottom portion 310 and extending along a third direction DR3.

The metal body portion includes first and second metal protrusion portions 315a and 315b protruding from the bottom portion 310 and extending in the third direction DR3. The number of the metal protrusion portions corresponds to the number of the alignment marks. In the present exemplary embodiment, the metal body portion of the case 300 includes the first and second metal protrusion portions 315a and 315b, which respectively correspond to the first and second alignment marks M1 and M2.

The first and second metal protrusion portions 315a and 315b have a shape protruding from the bottom portion 310. As a result, the static electricity applied to the case 300 from outside of the case 300 is concentrated at the first and second metal protrusion portions 315a and 315b on the bottom portion 310 in accordance with a principle of lightning rod as an analogy.

Referring to FIG. 3, because the first circuit board 240 has flexibility, the first circuit board 240 has a shape curved along a side surface of the display layer 210. That is, one end of the first circuit board 240 is on an upper/front surface of the display layer 210, and the other end of the first circuit board 240 is on, or adjacent, a rear surface of the display layer 210 (e.g., see FIG. 5). As described above, when the first circuit board 240 is curved along the side surface of the display layer 210, the second circuit board 250 connected to the other end of the first circuit board 240 is located on the rear surface of the display layer 210. That is, the display module 200 may be on the bottom portion 310 of the case 300 on the basis of the structure in which the second circuit board 250 is on the rear surface of the display layer 210.

According to the present exemplary embodiment, the first and second metal protrusion portions 315a and 315b correspond to the first and second alignment marks M1 and M2, respectively. As described above, when the display module 200 is coupled to the case 300, the first and second metal protrusion portions 315a and 315b may correspond to the first and second alignment marks M1 and M2, respectively.

According to the present exemplary embodiment, the first and second alignment marks M1 and M2 may be connected to a ground included in the second circuit board 250. Accordingly, the static electricity concentrated at the first and second metal protrusion portions 315a and 315b is transferred to the ground through the first and second alignment marks M1 and M2. This will be described in detail with reference to FIGS. 5 and 6.

Figure 4:
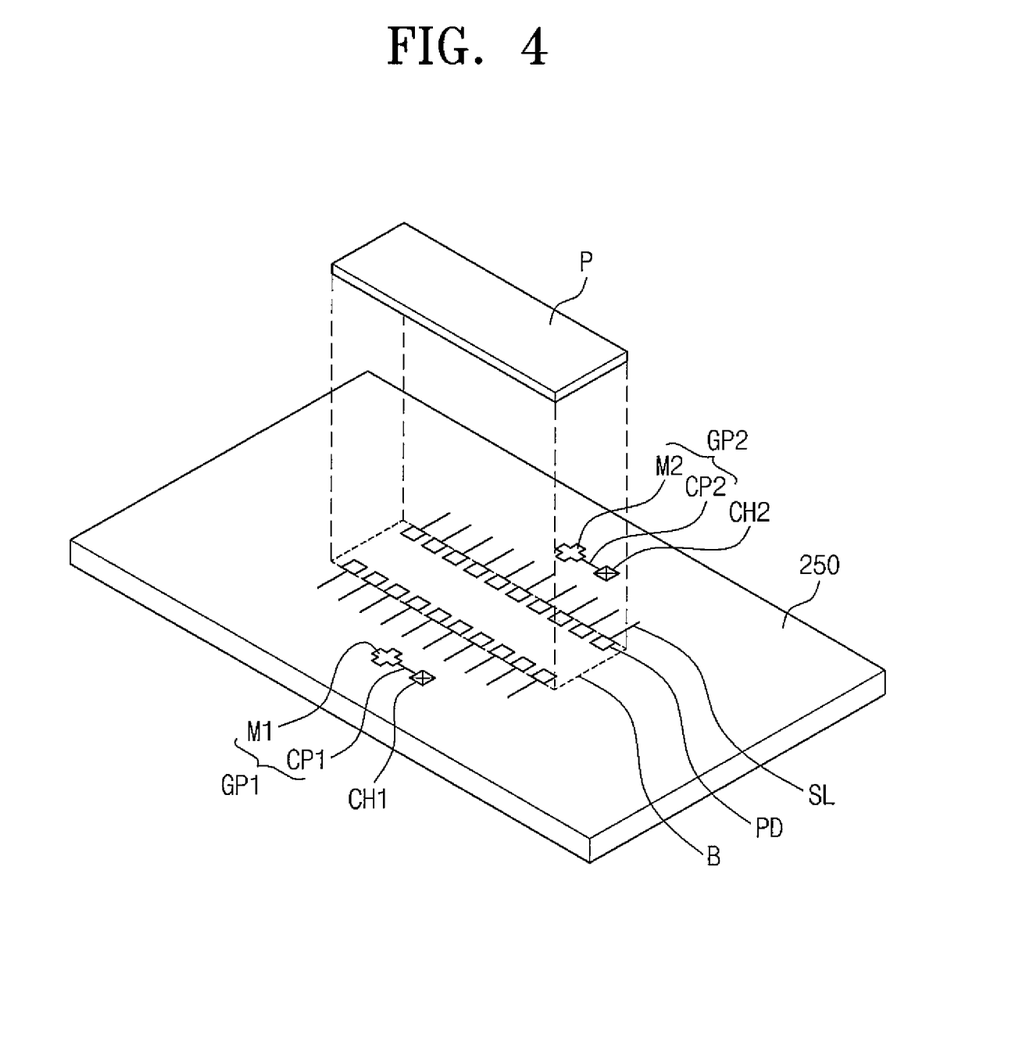
FIG. 4 is a perspective view showing a driving device mounted on the second circuit board shown in FIG. 2.

FIG. 4 is a perspective view showing the driving device mounted on the second circuit board shown in FIG. 2.

Referring to FIG. 4, the second circuit board 250 includes an area B in which the driving device P is located. The pads PD are disposed in the area B, and are electrically connected to the driving device P. The second circuit board 250 includes the signal lines SL electrically connected to the pads PD.

According to the present exemplary embodiment, the second circuit board 250 includes a first ground pattern GP1 and a second ground pattern GP2. The first ground pattern GP1 includes the first alignment mark M1 to align the driving device P with the area B, and includes a first connector CP1 electrically connected to the first alignment mark M1. The first connector CP1 is electrically connected to a via electrode located in a first contact hole CH1.

The second ground pattern GP2 includes the second alignment mark M2 to properly align the driving device P with the area B, and includes a second connector CP2 electrically connected to the second alignment mark M2. The second connector CP2 is also electrically connected to a via electrode located in a second contact hole CH2.

Figure 6:
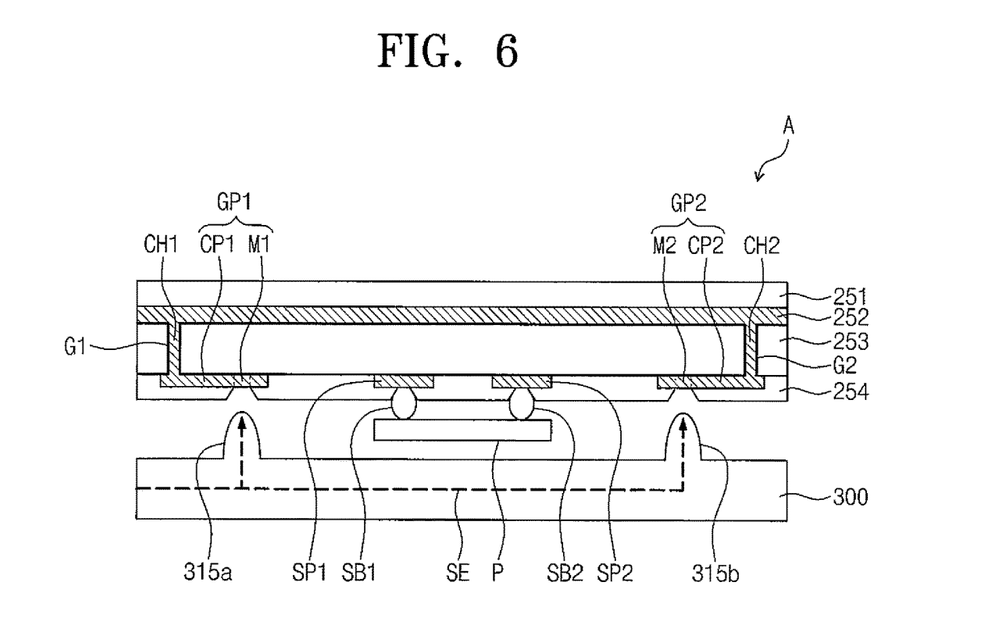
FIG. 6 is an enlarged view showing the area "A" shown in FIG. 5.

FIG. 5 is a cross-sectional view taken along the line I-I' shown in FIG. 3, and FIG. 6 is an enlarged view showing the area "A" shown in FIG. 5.

Referring to FIGS. 2 and 5, the display module 200 is coupled to the case 300. The window member 100 is located on the display module 200, and is coupled to the case 300.

The array substrate 211 is at the display area DA of the display layer 210. The driving integrated circuit 230 and the first circuit board 240 are at the non-display area NDA of the array substrate 211.

The driving integrated circuit 230 is bonded on the array substrate 211 through a first conductive adhesive member 230-P. As described above, the driving integrated circuit 230 may be patterned on the array substrate 211 in a chip-on-glass (COG) manner. One end of the first circuit board 240 is bonded on the array substrate 211 through a second conductive adhesive member 240-P. A signal line may be located on the array substrate 211 to electrically connect the first circuit board 240 and the driving integrated circuit 230.

The first circuit board 240 is curved along one side surface of the array substrate 211. As a result, the second circuit board 250 connected to the other end of the first circuit board 240 is on the rear surface of the array substrate 211. The second circuit board 250 is bonded to the other end of the first circuit board 240 through a third conductive adhesive member 250-P.

In addition, the display module 200 may further include a cushion tape 260 between the second circuit board 250 and the display layer 210. The cushion tape 260 prevents the second circuit board 250 from directly making contact with the array substrate 211, and thus damage to the second circuit board 250 may be prevented.

The driving device P is on the second circuit board 250 and faces the case 300. Similarly, the first and second alignment marks M1 and M2 used to align the driving device P on the second circuit board 250 are patterned on the second circuit board 250.

As shown in FIG. 5, the external static electricity SE may be applied to the inside of the case 300 from the outside of the case 300. In addition, since the case 300 is formed of metal material having electrical conductivity, the external static electricity SE may be transferred to the inside of the case 300 through various paths.

The static electricity SE from the outside of the case 300 is concentrated at the first and second metal protrusion portions 315a and 315b of the case 300. That is, electrons included in the static electricity SE are distributed in the first and second metal protrusion portions 315a and 315b each having a protrusion shape.

The case 300 includes the first metal protrusion portion 315a for facing the first alignment mark M1. In the present embodiment, the first metal protrusion portion 315a is spaced apart from the first alignment mark M1 and faces the first alignment mark M1, although the present invention is not limited thereto or thereby. That is, the first metal protrusion portion 315a may make contact with the first alignment mark M1.

The case 300 includes the second metal protrusion portion 315b facing the second alignment mark M2. Similarly, the second metal protrusion portion 315b is spaced from the second alignment mark M2 and faces the second alignment mark M2.

As described above, the static electricity SE transferred to the first and second metal protrusion portions 315a and 315b may be applied to the first and second alignment marks M1 and M2. The static electricity SE transferred to the first and second alignment marks M1 and M2 may be applied to the ground connected to the first and second alignment marks M1 and M2.

Referring to FIG. 6, the second circuit board 250 includes a first insulating layer 251, a ground layer 252, a second insulating layer 253, and a third insulating layer 254.

The first insulating layer 251 supports the second circuit board 250. The ground layer 252 is on/under the first insulating layer 251. The ground layer 252 may be, but is not limited to, a ground pattern disposed on the first insulating layer 251. The second insulating layer 253 is on/under the ground layer 252, although the present invention is not limited thereto or thereby. That is, there may be additional insulating layers between the first insulating layer and the second insulating layer.

The driving device P and first and second conductive patterns SP1 and SP2 connected to the driving device P may be located on/under the second insulating layer 253. The first alignment mark M1 and the first connector CP1, which is electrically connected to the first alignment mark M1, may be on/under the second insulating layer 253. The second alignment mark M2 and the second connector CP2, which is electrically connected to the second alignment mark M2, may also be on/under the second insulating layer 253.

According to the present exemplary embodiment, the second insulating layer 253 includes the first and second contact holes CH1 and CH2 formed therethrough, or defined thereby. In addition, the first via electrode G1 is located in the first contact hole CH1. The first via electrode G1 is electrically connected to the first connector CP1, and the first connector CP1 is electrically connected to the first alignment mark M1. The second via electrode G2 is located in the second contact hole CH2, and is electrically connected to the second connector CP2, while the second connector CP2 is electrically connected to the second alignment mark M2.

The third insulating layer 254 is on/under the first conductive pattern SP1, the second conductive pattern SP2, the first ground pattern GP1, and the second ground pattern GP2. In particular, a portion of the third insulating layer 254 may be etched to allow the first and second alignment marks M1 and M2 to be displayed/exposed to the outside.

In FIG. 6, the first and second alignment marks M1 and M2 are respectively exposed through contact holes formed through/defined by the third insulating layer 254, although the alignment structure of the first and second alignment marks M1 and M2 is not limited thereto or thereby. For instance, the first and second alignment marks M1 and M2 may be located above the third insulating layer 254.

In addition, a portion of the third insulating layer 254 may be etched to allow the first and second conductive patterns SP1 and SP2 to be exposed to the outside. Accordingly, the first conductive pattern SP1 may be connected to a first solder bump SB1, and the second conductive pattern SP2 may be connected to a second solder bump SB2. The driving device P is electrically connected to the first and second solder bumps SB1 and SB2. As a result, electrical signals output from the driving device P may be applied to the first and second conductive patterns SP1 and SP2 through the first and second solder bumps SB1 and SB2, respectively.

According to the present exemplary embodiment, the first and second conductive patterns SP1 and SP2 connected to the driving device P are located on the second insulating layer 253, although they are not limited thereto or thereby. That is, the second circuit board 250 may further include conductive patterns and ground patterns, which are located on another layer.

The static electricity SE from outside of the case 300 may be intensely concentrated at the first and second metal protrusion portions 315a and 315b. For instance, the static electricity SE transferred to the first metal protrusion portion 315a may be applied to the first alignment mark M1 facing the first metal protrusion portion 315a. The static electricity SE transferred to the first alignment mark M1 may be applied to the ground layer 252 through the first ground pattern GP1, which is electrically connected to the first alignment mark M1.

As an example, the static electricity SE transferred to the second metal protrusion portion 315b may be applied to the second alignment mark M2 facing the second metal protrusion portion 315b. The static electricity SE transferred to the second alignment mark M2 may be applied to the ground layer 252 through the second ground pattern GP2, which is electrically connected to the second alignment mark M2.

As described above, in the case where the static electricity SE is transferred to the case 300 of the display device DD1 according to the present exemplary embodiment, the static electricity SE may be transferred to the first and second alignment marks M1 and M2 through the first and second metal protrusion portions 315a and 315b, respectively. The static electricity SE transferred to the first and second alignment marks M1 and M2 may be applied to the ground layer 252 through the connectors CP1 and CP2 and the via electrodes G1 and G2.

Thus, the static electricity SE from the outside of the case 300 may be prevented from being transferred to the driving device P included in the display module 200.

Figure 7:
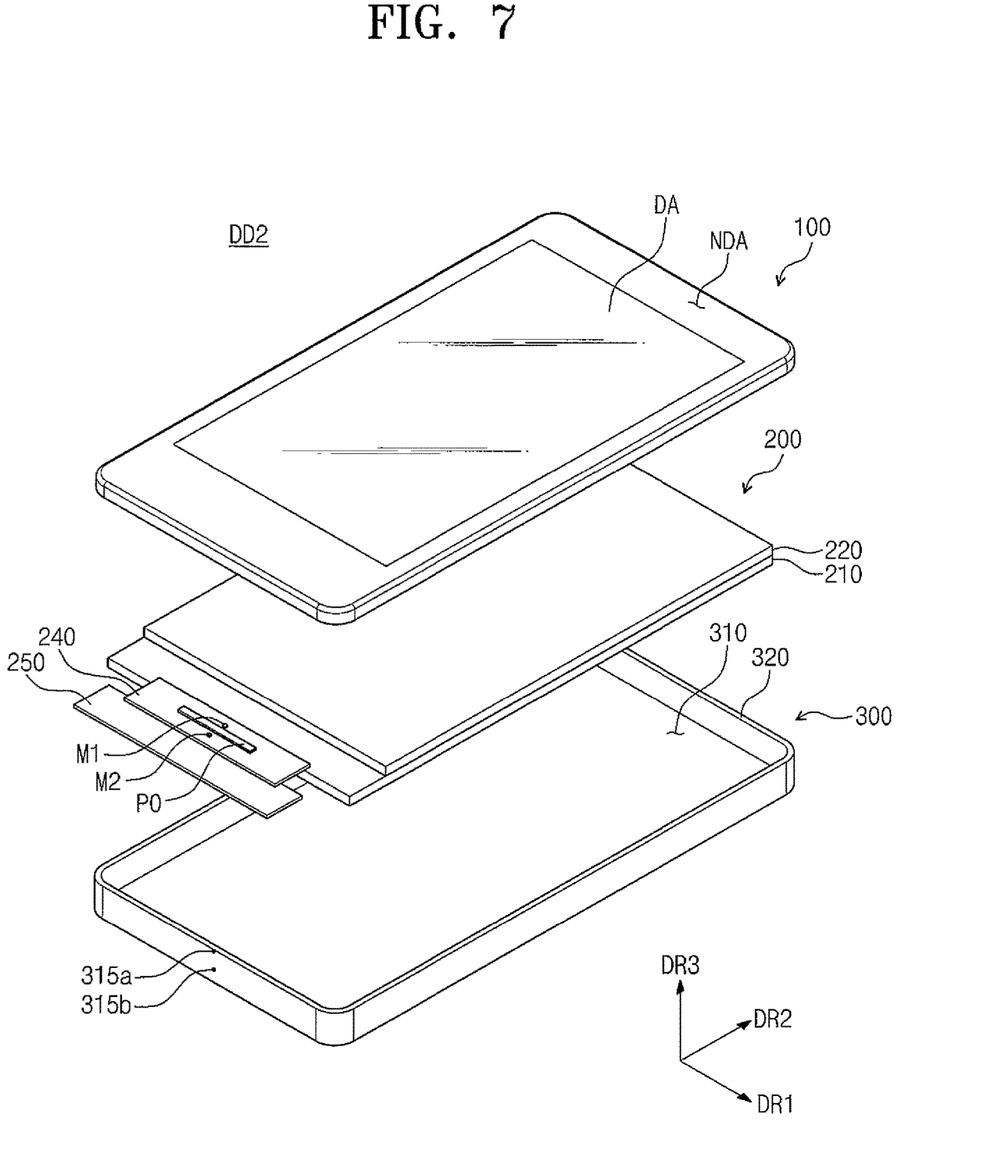
FIG. 7 is an exploded perspective view showing a display device according to another exemplary embodiment of the present disclosure.
Figure 8:
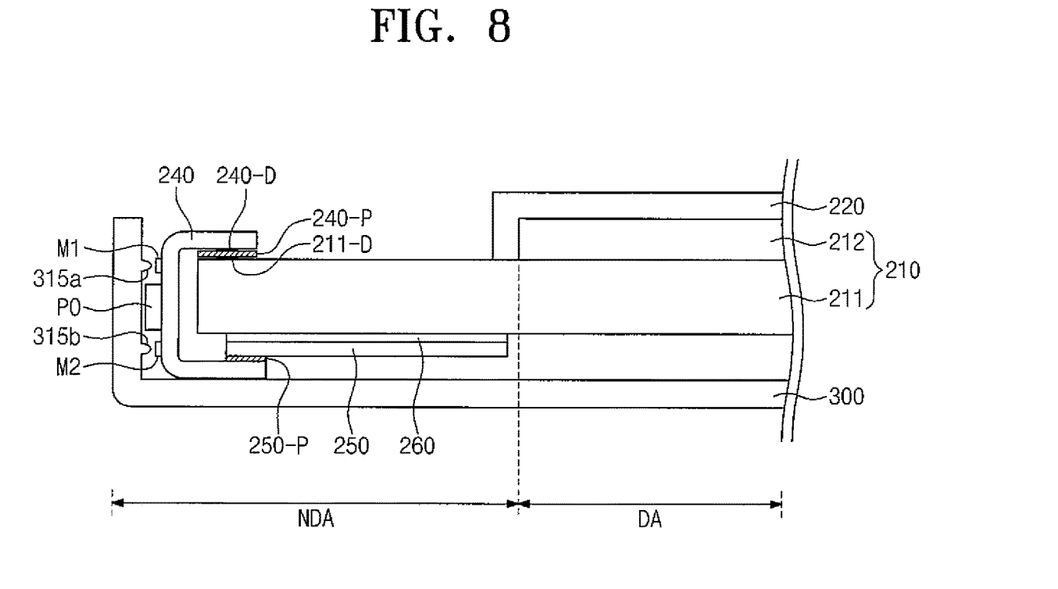
FIG. 8 is a cross-sectional view showing a display device according to another exemplary embodiment of the present disclosure.

FIG. 7 is an exploded perspective view showing a display device DD2 according to another exemplary embodiment of the present disclosure, and FIG. 8 is a cross-sectional view showing the display device DD2 according to another exemplary embodiment of the present disclosure.

The display device DD2 has the same structure and function as those of the display device DD1 shown in FIG. 2 with the exception of a driving integrated circuit 230, a driving device PO, a first alignment mark M1, and a second alignment mark M2.

According to the present exemplary embodiment, the driving device PO shown in FIG. 7 may include both of the driving device P and the driving integrated circuit 230 shown in FIG. 2. That is, the driving device PO may be a single chip for applying image signals and driving signals to the pixels PX to display the image IM.

However, the driving device PO is not limited thereto or thereby. That is, the driving device PO may include only the driving integrated circuit 230 shown in FIG. 2. When the driving device PO includes only the driving integrated circuit 230, the driving device P shown in FIG. 2 may also be located on the second circuit board 250.

Hereinafter, the driving device PO, the first alignment mark M1, and the second alignment mark M2 will be described in detail, and repeated description of other elements will be omitted.

Referring to FIGS. 7 and 8, the driving device PO according to the present exemplary embodiment is located on the first circuit board 240. That is, the driving device P may be located on the first circuit board 240 in a chip-on-film manner, or in a chip-on-glass (COG) manner. In addition, the first alignment mark M1 and the second alignment mark M2 are located on the first circuit board 240 to align the driving device PO.

The first circuit board 240 includes a ground layer. The first and second alignment marks M1 and M2 on the first circuit board 240 are electrically connected to the ground layer of the first circuit board 240. In addition, the first circuit board 240 may further include a conductive pattern electrically connected to the driving device PO and an insulating layer. That is, the first circuit board 240 may include the elements of the second circuit board 250 shown in FIG. 6.

According to the present exemplary embodiment, the case 300 includes a metal body portion, and includes a metal protrusion portion protruding from the metal body portion. In particular, the first and second metal protrusion portions 315*a* and 315*b* shown in FIG. 7 are located on/extend from a sidewall portion 320 of the metal body portion.

Referring to FIG. 8, the first circuit board 240 is curved along a side surface of the array substrate 211. The driving device PO on the first circuit board 240 faces the sidewall portion 320 of the case 300.

In addition, a first pad part 211-D is located on the array substrate 211. A second pad part 240-D is located at one end of the first circuit board 240, and is electrically connected to the first pad part 211-D. The first and second pad parts 211-D and 240-D may be connected to each other through a second conductive adhesive member 240-P.

When the display module 200 is coupled to the case 300, the first and second alignment marks M1 and M2 face the first and second metal protrusion portions 315*a* and 315*b*, respectively.

As described above, the static electricity from the outside of the case 300 may be concentrated at the first and second metal protrusion portions 315*a* and 315*b* through the sidewall portion 320 of the metal body portion. As a result, the static electricity transferred to the first and second metal portions 315*a* and 315*b* may be transferred to the ground through the first and second alignment marks M1 and M2 included in the first circuit board 240.

Figure 9:
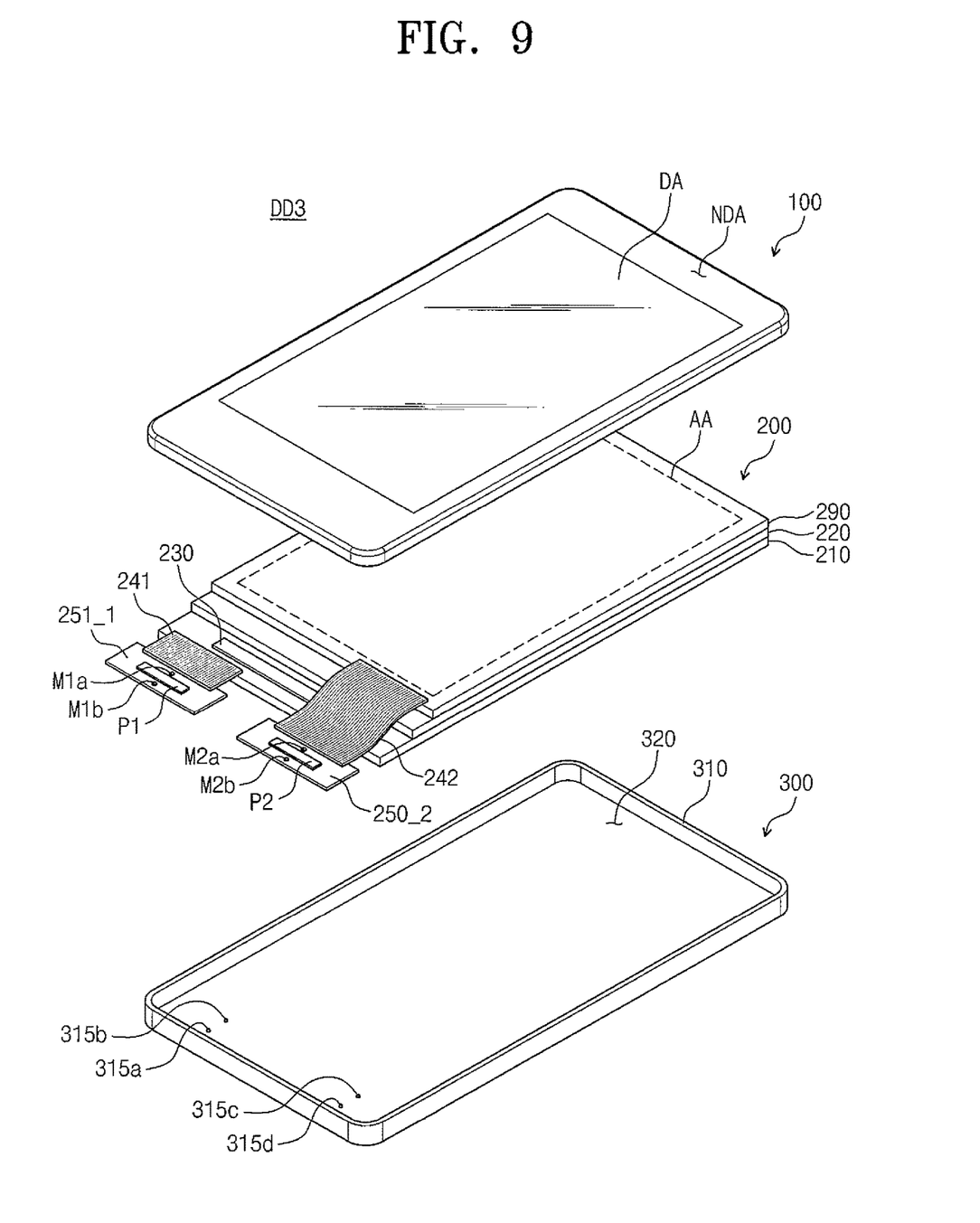
FIG. 9 is an exploded perspective view showing a display device according to another exemplary embodiment of the present disclosure.

FIG. 9 is an exploded perspective view showing a display device DD3 according to another exemplary embodiment of the present disclosure.

The display device DD3 shown in FIG. 9 may further include a touch panel 290 included in a display module 200, in contrast to the display device DD1 shown in FIG. 2. The display module 200 may further include a touch circuit board 250_2 for generating driving signals required to drive the touch panel 290, a second driving device P2, and a second sub-circuit board 242 connecting the touch panel 290 and the touch circuit board 250_2. In addition, a first sub-circuit board 241, a circuit board 251_1, and a first driving device P1 are substantially the same as those of the display device DD1 shown in FIG. 2. Accordingly, details of the same elements will be omitted.

The touch panel 290 includes an active area AA defined therein, in which a touch signal may be sensed. The touch panel 290 is configured to sense the touch signal through the active area AA, which is applied thereto from the outside.

The second sub-circuit board 242 is electrically connected to a non-active area of the touch panel 290, in which the touch signal is not sensed. The second sub-circuit board 242 is bonded to the non-active area of the touch panel 290 through a pad. The second driving device P2 on the touch circuit board 250_2 outputs touch driving signals required to drive the touch panel 290. In this case, the touch driving signals output from the second driving device P2 are applied to the touch panel 290 through the second sub-circuit board 242.

The touch circuit board 250_2 includes first and second alignment marks M1*a* and M1*b* to align the first driving device P1, and includes third and fourth alignment marks M2*a* and M2*b* to align the second driving device P2.

According to the present exemplary embodiment, the circuit board 251_1 and the touch circuit board 250_2 may have the same structure as that of the second circuit board 250 shown in FIG. 6. That is, the first to fourth alignment marks M1*a*, M1*b*, M2*a*, and M2*b* respectively located on the circuit board 251_1 and the touch circuit board 250_2 may be electrically connected to the ground through the configuration of FIG. 6.

Third and fourth metal protrusion portions 315*c* and 315*d* respectively corresponding to the third and fourth alignment marks M2*a* and M2*b* may be further located on the bottom portion 310 of the case 300. As shown in FIG. 3, when the display module 200 is coupled to the case 300, the third and fourth alignment marks M2*a* and M2*b* may face the third and fourth metal protrusion portions 315*c* and 315*d*, respectively. In this case, the third and fourth alignment marks M2*a* and M2*b* may be spaced apart from, or may make contact with, the third and fourth metal protrusion portions 315*c* and 315*d*.

Accordingly, the static electricity concentrated at the first to fourth metal protrusion portions 315*a*, 315*b*, 315*c*, and 315*d* may be transferred to the ground through the first to fourth alignment marks M1*a*, M1*b*, M2*a*, and M2*b*, respectively.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed by the claims and their equivalents.

What is claimed is:

1. A display device comprising:
    a display panel comprising a display area and a non-display area;
    a circuit board connected electrically to the display panel and folded over to be disposed below the display panel, the circuit board overlapping the display panel in a plan view;
    a driving device mounted on the circuit board and configured to apply an electrical signal to the display panel; and
    a case comprising:
        a metal body portion housing the display panel and the circuit board; and
        a metal protrusion portion protruding from the metal body portion, wherein the circuit board comprises:
        a ground layer;
        an insulating layer defining a contact hole therethrough;
        a ground pattern electrically connected to the ground layer through the contact hole of the insulating layer, and facing the metal protrusion portion; and
        a via electrode for electrically connecting the ground layer and the ground pattern, and located in the contact hole defined by the insulating layer, and
    wherein the metal protrusion portion overlaps the ground pattern in the plan view and is spaced from the ground pattern in a thickness direction of the display panel.

2. The display device of claim 1, wherein the metal body portion comprises:
a bottom portion having the metal protrusion portion thereon; and
a sidewall portion extending away from the bottom portion.

3. The display device of claim 2, further comprising:
a plurality of ground patterns comprising the ground pattern; and
a plurality of metal protrusion portions comprising the metal protrusion portion,
wherein the metal protrusion portions correspond to the ground patterns, respectively.

4. The display device of claim 1, further comprising a sub-circuit board for electrically connecting the circuit board and the display panel.

5. The display device of claim 4, wherein the sub-circuit board comprises a flexible circuit board.

6. The display device of claim 1, wherein the insulating layer comprises:
a first insulating layer supporting the ground layer; and
a second insulating layer covering the ground layer,
wherein the ground pattern is on the second insulating layer.

7. The display device of claim 6, wherein the circuit board comprises the via electrode.

8. The display device of claim 7, wherein the ground pattern comprises:
an alignment mark; and
a connector for electrically connecting the alignment mark and the via electrode.

9. The display device of claim 1, further comprising a touch panel on the display panel.

10. The display device of claim 9, further comprising a touch circuit board that is configured to apply an electrical signal to the touch panel,
wherein the case comprises a second metal protrusion portion protruding from the metal body portion, and
wherein the touch circuit board comprises:
the ground layer;
a second insulating layer; and
a second ground pattern electrically connected to the ground layer and facing the second metal protrusion portion.

11. The display device of claim 10, further comprising:
a first sub-circuit board for electrically connecting the circuit board and the display panel; and
a second sub-circuit board for electrically connecting the touch circuit board and the touch panel.

12. The display device of claim 11, wherein each of the first and second sub-circuit boards comprises a flexible circuit board.

13. A display device comprising:
a window member comprising a display area displaying an image and a non-display area;
a display panel disposed below the window member and outputting a light to the display area;
a circuit board disposed below the display panel and electrically connected to the display panel, the circuit board being folded over to overlap the display panel in a plan view;
a driving device mounted on the circuit board and configured to apply an electrical signal to the display panel; and
a case comprising:
a metal body portion housing the display panel and the circuit board; and
a metal protrusion portion protruding from the metal body portion and overlapping with the display panel in the plan view,
wherein the circuit board comprises:
a ground layer;
an insulating layer;
a ground pattern electrically connected to the ground layer through a contact hole of the insulating layer, and facing the metal protrusion portion; and
a via electrode for electrically connecting the ground layer and the ground pattern, and located in the contact hole defined by the insulating layer, and
wherein the metal protrusion portion overlaps the ground pattern in the plan view and is spaced from the ground pattern in a thickness direction of the display panel.

* * * * *